(12) United States Patent
Shen et al.

(10) Patent No.: US 11,985,400 B2
(45) Date of Patent: May 14, 2024

(54) CAMERA MODULE AND ELECTRONIC DEVICE

(71) Applicant: VIVO MOBILE COMMUNICATION CO., LTD., Guangdong (CN)

(72) Inventors: Chao Shen, Guangdong (CN); Wei Wang, Guangdong (CN); Dongcun Cheng, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 214 days.

(21) Appl. No.: 17/682,854

(22) Filed: Feb. 28, 2022

(65) Prior Publication Data

US 2022/0182514 A1 Jun. 9, 2022

Related U.S. Application Data

(63) Continuation of application No. PCT/CN2020/117458, filed on Sep. 24, 2020.

(30) Foreign Application Priority Data

Sep. 30, 2019 (CN) .......................... 201910942340.9

(51) Int. Cl.
*H04N 23/51* (2023.01)
*G02B 27/64* (2006.01)
*H04N 23/54* (2023.01)

(52) U.S. Cl.
CPC ........... *H04N 23/51* (2023.01); *G02B 27/646* (2013.01); *H04N 23/54* (2023.01)

(58) Field of Classification Search
CPC ........ H04N 23/51; H04N 23/54; H04N 23/55; H04N 23/57; H04N 23/58; H04N 23/685;
(Continued)

(56) References Cited

U.S. PATENT DOCUMENTS

2002/0067920 A1 6/2002 Weng et al.
2005/0206736 A1* 9/2005 Ng ........................ H04N 23/687
348/208.99
(Continued)

FOREIGN PATENT DOCUMENTS

CN 2629343 Y 7/2004
CN 2807646 Y 8/2006
(Continued)

OTHER PUBLICATIONS

Extended European Search Report on the European Patent Application No. 20872134.0 issued by the European Patent Office dated Sep. 20. 2022.
(Continued)

*Primary Examiner* — Albert H Cutler
(74) *Attorney, Agent, or Firm* — IP & T GROUP LLP (57) ABSTRACT

A camera module includes a module housing, a driving mechanism and a mechanical anti-shake camera assembly. The module housing has a housing inner cavity; the mechanical anti-shake camera assembly is at least partially disposed in the housing inner cavity; the mechanical anti-shake camera assembly rotates along with the module housing; the driving mechanism is connected to the module housing; the mechanical anti-shake camera assembly includes a camera; in a case that the camera is located at a first position, a lens axis of the camera is coinciding or parallel to a rotation axis of the module housing; in a case that the camera is located at a second position, an included angle is formed between the lens axis and the rotation axis of the module housing, and the driving mechanism drives the module housing to rotate.

18 Claims, 4 Drawing Sheets

(58) Field of Classification Search
CPC .... H04N 23/50; H04N 23/687; H04N 23/698; H04N 23/695; G02B 27/646; G02B 7/02
See application file for complete search history.

(56) References Cited

U.S. PATENT DOCUMENTS

| | | | |
|---|---|---|---|
| 2008/0273092 | A1 | 11/2008 | Chiou et al. |
| 2008/0316344 | A1* | 12/2008 | Yamamiya ............. G03B 19/12 348/340 |
| 2016/0150134 | A1* | 5/2016 | Katoh .................... H04N 23/54 348/373 |
| 2018/0364494 | A1 | 12/2018 | Masahiro |
| 2019/0018259 | A1 | 1/2019 | Minamisawa et al. |
| 2019/0037139 | A1 | 1/2019 | Ding et al. |
| 2019/0258144 | A1 | 8/2019 | Strobert, Jr. et al. |
| 2019/0260943 | A1* | 8/2019 | Strobert, Jr. ....... F16M 11/2014 |
| 2019/0289180 | A1 | 9/2019 | Wang |

FOREIGN PATENT DOCUMENTS

| | | |
|---|---|---|
| CN | 205707401 U | 11/2016 |
| CN | 106713557 A | 5/2017 |
| CN | 107071266 A | 8/2017 |
| CN | 207867190 U | 9/2018 |
| CN | 108696687 A | 10/2018 |
| CN | 208158640 U | 11/2018 |
| CN | 109413316 A | 3/2019 |
| CN | 209402619 U | 9/2019 |
| CN | 209431037 U | 9/2019 |
| CN | 110661951 A | 1/2020 |
| JP | 2002-354082 A | 12/2002 |
| JP | 2007028605 A | 2/2007 |
| JP | 2017-116814 A | 6/2017 |
| KR | 102017222 B1 | 9/2019 |

OTHER PUBLICATIONS

First Office Action on the Indian Patent Application No. 202217011517 issued by the Indian Patent Office dated Jul. 18, 2022.
The First Office Action of Priority Application No. CN 201910942340.9 issued by the Chinese Patent Office dated Sep. 1, 2020.
International Search Report and Written Opinion of International Application No. PCT/CN2020/117458 issued by the Chinese Patent Office dated Dec. 24, 2020.

* cited by examiner

CAMERA MODULE AND ELECTRONIC DEVICE

CROSS-REFERENCE TO RELATED APPLICATIONS

This application is a Bypass Continuation Application of PCT/CN2020/117458 filed on Sep. 24, 2020, which claims priority to Chinese Patent Application No. 201910942340.9 filed on Sep. 30, 2019, which are incorporated herein by reference in their entirety.

TECHNICAL FIELD

The present invention relates to the technical field of communication devices, and in particular, to a camera module and a terminal device.

BACKGROUND

With the technological progress, the performance of the electronic device (such as a mobile phone) has been continuously optimized. As a powerful tool, the electronic device can greatly facilitate the life and work of users. The camera function is the basic function of the electronic device, which can meet the shooting demand of customers.

SUMMARY

A camera module includes a module housing, a driving mechanism and a mechanical anti-shake camera assembly, wherein the module housing has a housing inner cavity; the mechanical anti-shake camera assembly is at least partially disposed in the housing inner cavity; the mechanical anti-shake camera assembly can rotate along with the module housing; the driving mechanism is connected to the module housing; the mechanical anti-shake camera assembly includes a camera; in a case that the camera is located in a first position, a lens axis of the camera is coinciding or parallel to a rotation axis of the module housing; and in a case that the camera is located at a second position, an included angle is formed between the lens axis and the rotation axis, and the driving mechanism drives the module housing to rotate.

An electronic device includes a device housing and the above camera module, wherein the driving mechanism is disposed on the device housing, and the module housing is rotatably disposed on the device housing.

BRIEF DESCRIPTION OF DRAWINGS

The accompanying drawings described herein are provided for understanding of the present invention, constitute a part of the present invention, and are only used to explain the present invention, but do not constitute inappropriate limitations to the present invention. In the accompanying drawings.

DESCRIPTION OF REFERENCE NUMERALS

100—module housing, 110—housing inner cavity,
200—driving mechanism, 210—driving motor, 220—driving gear, 230—annular structural member, 231—circular arc rack,
300—mechanical anti-shake camera assembly,
310—camera, 311—lens,
320—first bracket, 321—bracket main body, 3211—first avoidance hole, 322—first connecting arm, 323—first hinged hole, 324—second connecting arm, 325—second hinged hole,
330—first hinged shaft,
340—second bracket,
400—device housing,
500—flexible electrical connector,
600—bearing,
700—cover body, 710—second avoidance hole.

DETAILED DESCRIPTION OF EMBODIMENTS

To make the objectives, technical solutions and advantages of the present invention clearer, the following clearly describes the technical solutions of the present invention with reference to the embodiments of the present invention and the corresponding accompanying drawings. Apparently, the described embodiments are merely a part rather than all of the embodiments of the present invention. All other embodiments obtained by a person of ordinary skill in the art based on the embodiments of the present invention shall fall within the protection scope of the present invention.

At present, the camera of the electronic device has a small shooting field of view. In the shooting process, in order to obtain a larger field of view, the current electronic device needs to be equipped with a driving mechanism for driving the camera to rotate in multiple directions. This driving mechanism often has a complicated structure and high cost, resulting in the complicated structure of the electronic device and high manufacturing cost.

The technical solutions disclosed by various embodiments of the present invention are described below with reference to the accompanying drawings.

Referring to FIG. 1 to FIG. 4, embodiments of the present invention disclose a camera module. The disclosed camera module can be applied to an electronic device. The disclosed camera module may include a module housing 100, a driving mechanism 200 and a mechanical anti-shake camera assembly 300.

The module housing 100 is a basic component of the camera module, and the module housing 100 can provide an installation basis for other components of the camera module. In the embodiments of the present invention, the module housing 100 has a housing inner cavity 110, the housing inner cavity 110 has an opening, and the opening plays a role in avoidance. The mechanical anti-shake camera assembly 300 is at least partially disposed in the housing inner cavity 110, the mechanical anti-shake camera assembly 300 includes a camera 310, and the camera 310 can realize image shooting through the opening.

In the embodiments of the present invention, the module housing 100 is a rotatable structural member, and the mechanical anti-shake camera assembly 300 can rotate along with the module housing 100. Generally, the electronic device disclosed by the embodiments of the present invention may include a device housing 400, and the module housing 100 is rotatably disposed on the device housing 400 so as to realize rotation. In an implementation manner, the module housing 100 may be rotatably disposed on the device housing 400 through a bearing 600.

The driving mechanism 200 is connected to the module housing 100, and the driving mechanism 200 can drive the module housing 100 to rotate. Essentially, the driving mechanism 200 can drive the module housing 100, so that the module housing 100 and the mechanical anti-shake camera module 300 can rotate together.

Figure 1:
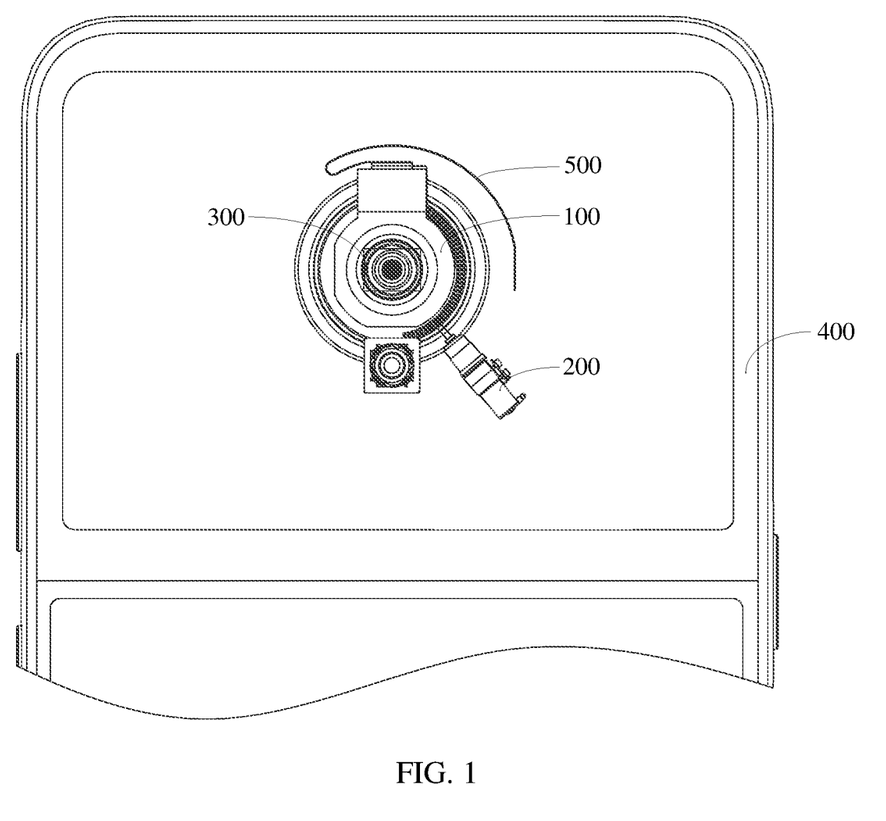
FIG. 1 and FIG. 2 are respectively structural diagrams of an electronic device according to an embodiment of the present invention in a case that a camera module is in different states.
Figure 2:
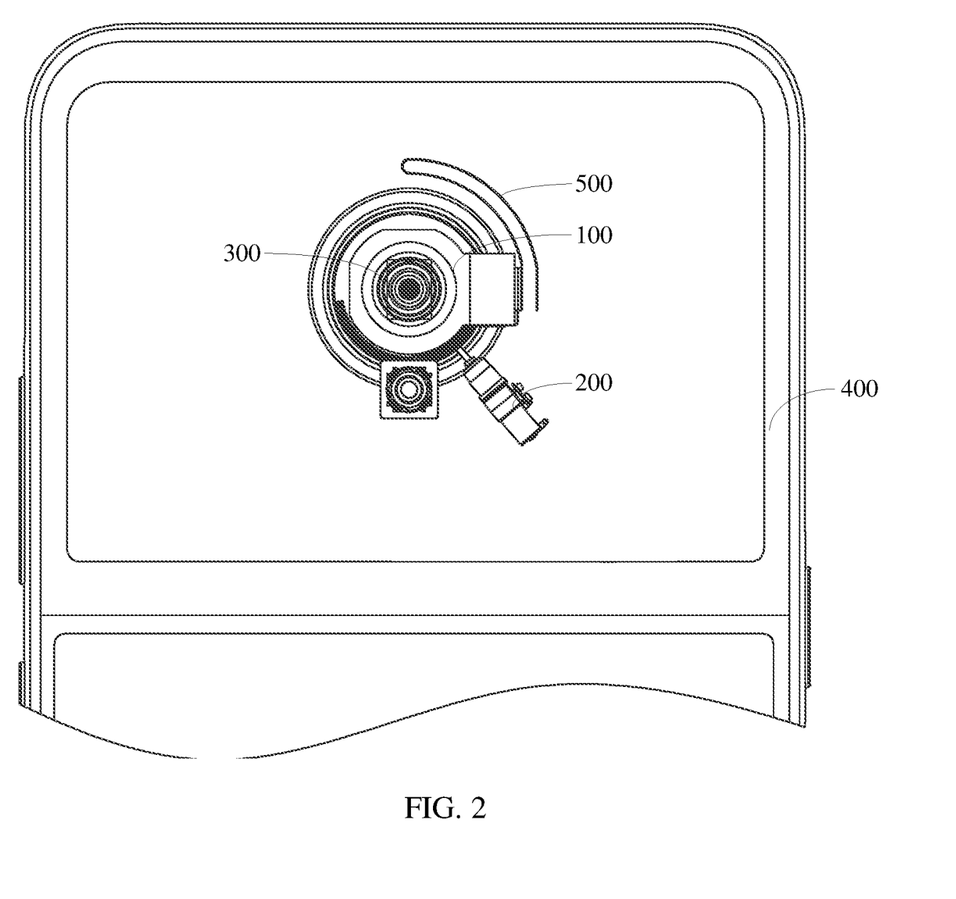

The mechanical anti-shake camera module 300 includes a camera 310. In the working process, in a case that the whole camera module inclines due to shaking, the camera 310 can rotate so as to perform angle compensation on the inclination and realize anti-shake. The camera 310 can rotate, so the camera 310 has a plurality of positions. In a case that the camera 310 is located at a first position, a lens axis of the camera 310 is coinciding or parallel to a rotation axis of the module housing 100. In a case that the camera 310 is located at the first position, the camera module does not incline, and the camera 310 does not incline either.

In a case that the camera 310 is located at a second position, an included angle is formed between the lens axis of the camera 310 and the rotation axis of the module housing 100; and in this case, the driving mechanism 200 drives the module housing 100 to rotate. For example, the included angle between the lens axis of the camera 310 and the rotation axis of the module housing 100 may be an acute angle. In a case that the camera 310 is located at the second position, the camera 310 can be in an inclined state. In this case, the module housing 100 is driven to realize that the camera 310 can shoot an image in a larger field of view.

The camera module disclosed by the embodiments of the present invention makes full use of the structural feature that the camera 310 of the mechanical anti-shake camera assembly 300 can rotate based on the mechanical anti-shake camera assembly 300, and drives the module housing 100 by the driving mechanism 200 to rotate so as to drive the camera 310 in an inclined state to rotate again, thereby enabling the camera 310 to obtain a larger shooting field of view. The camera module does not need to be equipped with a special driving mechanism for driving the camera to rotate in multiple directions. Obviously, the electronic device disclosed by the embodiments of the present invention has a simple structure and low manufacturing cost.

Figure 3:
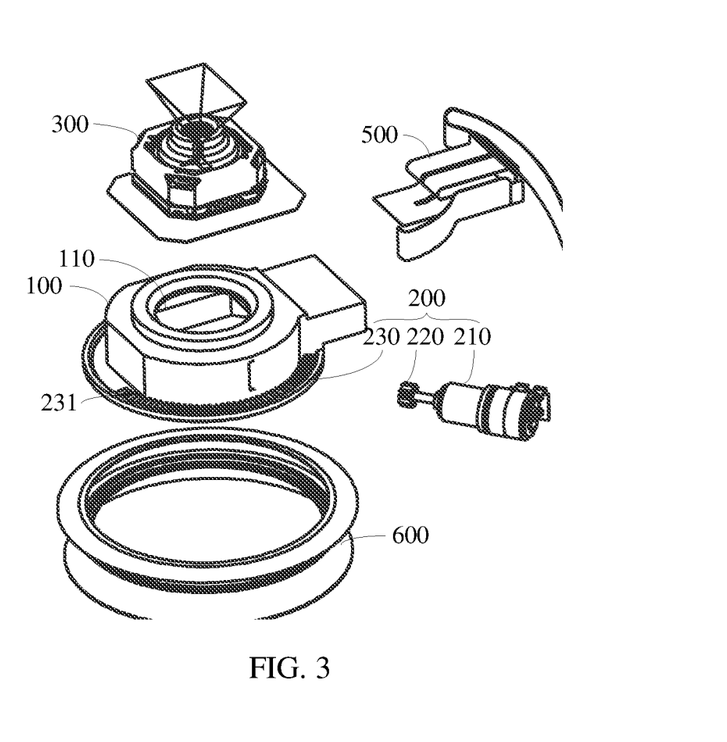
FIG. 3 is an exploded schematic diagram of part of a structure of an electronic device according to an embodiment of the present invention.

In the embodiments of the present invention, there may be many types of mechanical anti-shake camera assemblies 300. Referring to FIG. 3 and FIG. 4 again, in an implementation manner, the mechanical anti-shake camera assembly 300 may further include a first bracket 320, the first bracket 320 is at least partially disposed in the housing inner cavity 110, the camera 310 is at least partially disposed in the housing inner cavity 110, and the camera 310 can perform shooting through the opening of the housing inner cavity 110.

Figure 4:
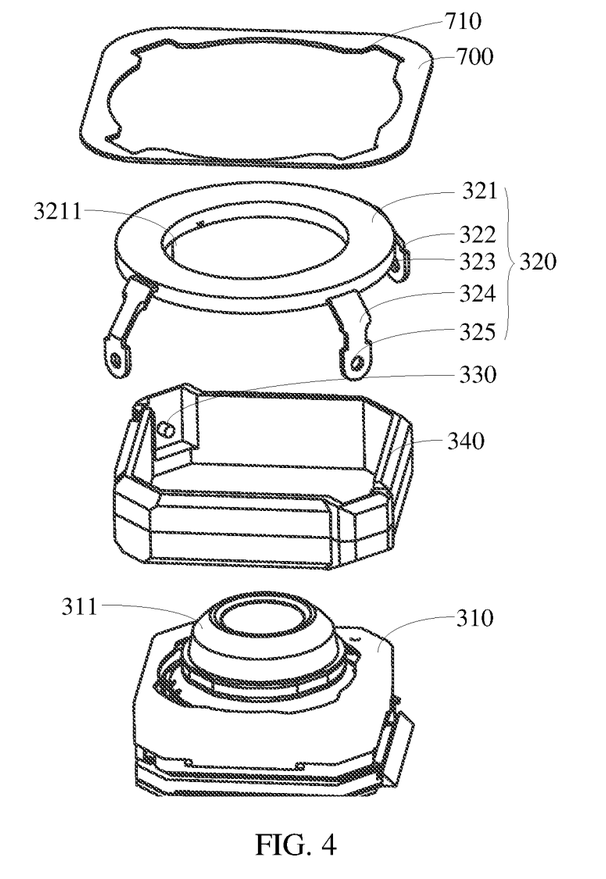
FIG. 4 is an exploded schematic diagram of part of a structure of an electronic device according to an embodiment of the present invention.

In the embodiments of the present invention, the camera 310 is hinged with the first bracket 320 through the first hinged shaft 330, and the camera 310 can rotate around the first hinged shaft 330. The first bracket 320 is hinged with the module housing 100 through the second hinged shaft, and the first bracket 320 rotates around the second hinged shaft. The axis of the first hinged shaft 330 and the axis of the second hinged shaft are intersected or located on different planes. That is, a direction in which the camera 310 rotates around the first hinged shaft 330 is inconsistent with a direction in which the first bracket 320 rotates around the second hinged shaft.

In the shooting process, the camera module will incline due to shaking, which will finally affect the shooting quality.

In the camera module disclosed by the embodiments of the present invention, the camera 310 can rotate relative to the first bracket 320 around the first hinged shaft 330, and the first bracket 320 is rotatably connected to the module housing 100 through the second hinged shaft, so the camera 310 can rotate together with the first bracket 320 around the second hinged shaft relative to the module housing 100. The axis of the first hinged shaft 330 and the axis of the second hinged shaft are intersected or located on different planes, so rotation of the camera 310 in the two directions can compensate angle components of inclination of the camera module caused by shaking in the two directions, and finally, the camera module can be effectively prevented from being shaken.

In an optional solution, the axis of the first hinged shaft 330 may be perpendicular to the axis of the second hinged shaft. In this case, the inclination angle generated by the shaking of the whole camera module in the shooting process is easily decomposed into two angle components respectively around the direction of the first hinged shaft 330 and around the direction of the second hinged shaft, so that angle compensation of the camera 310 in the rotating process is facilitated.

The camera 310 is a relatively precise device. In order to avoid damage to the camera 310 caused by assembling, in an optional solution, the camera module disclosed by the embodiments of the present invention may further include a second bracket 340, and the camera 310 is fixedly connected to the second bracket 340. The second bracket 340 is hinged with the first bracket 320 through the first hinged shaft 330. In this case, the camera 310 can rotate together with the second bracket 340 around the first hinged shaft 330. In this case, the camera 310 does not need to directly perform rotatable connection, and the camera 310 and the second bracket 340 may adopt an easy assembling manner by which the camera 310 is not liable to damage.

The first bracket 320 may have many structures. In an optional solution, the first bracket 320 may include a bracket main body 321 and a first connecting arm 322, and a first end of the first connecting arm 322 is fixedly connected to the bracket main body 321. A second end of the first connecting arm 322 is a free end. The second hinged shaft may be fixed on the module housing 100, a bottom end of the first connecting arm 322 may be provided with a first hinged hole 323, and the second hinged shaft is hinged with the first hinged hole 323. The first connecting arm 322 is hinged with the module housing 100 through the second hinged shaft, which is beneficial to reducing the occupied space of a hinged structure. Furthermore, the second end of the first connecting arm 322 is a free end, that is, the first connecting arm 322 has a cantilever structure, and the second end of the first connecting arm 322 may extend into the housing inner cavity 110 to realize hinged connection, which is favorable for the miniaturization design of the whole camera module.

In an optional solution, the first bracket 320 further may include a second connecting arm 324, a first end of the second connecting arm 324 is fixedly connected to the bracket main body 321, and a second end of the second connecting arm 324 is a free end. The first hinged shaft 330 is fixed on the second bracket 340 or the camera 310, the second end of the second connecting arm 324 is provided with a second hinged hole 325, the second hinged hole 325 is hinged with the first hinged shaft 330, similarly, the second end of the second connecting arm 324 may extend into the housing inner cavity 110 to realize hinged connection, which is favorable for the miniaturization design of the whole camera module. Meanwhile, the second connecting arm 324 has a cantilever structure, and the second hinged hole 325 is formed at the free end of the second connecting arm 324, so hinged assembling is easily realized through the deformation of the second connecting arm 324.

In order to improve the hinged stability, in an optional solution, there may be two first connecting arms 322 and two second connecting arms 324, the two first connecting arms 322 may be diagonally and respectively distributed on two sides of the camera 310, and the two second connecting arms 324 may be diagonally and respectively distributed on two sides of the camera 310. In this case, each first connecting arm 322 may be hinged with one second hinged shaft, and each second connecting arm 324 may be hinged with one first hinged shaft 330, so that the balance of rotatable connection can be improved undoubtedly.

In the embodiments of the present invention, the bracket main body 321 is a main body part of the first bracket 320, and the bracket main body 321 can ensure that the first connecting arm 322 and the second connecting arm 324 have high strength. The bracket main body 321 may have many structures. In an optional solution, the bracket main body 321 may be provided with a first avoidance hole 3211. The lens 311 of the camera 310 may be disposed opposite to the first avoidance hole 3211, and the lens 311 of the camera 310 may perform shooting through the first avoidance hole 3211.

For example, the lens 311 of the camera 310 may be completely located in the housing inner cavity 110, or may be located in the first avoidance hole 3211, or may extend out of the housing inner cavity 110 through the first avoidance hole 3211. In order to prevent the opening of the first avoidance hole 3211 from being too large, in an optional solution, the lens 311 of the camera 310 is located in the first avoidance hole 3211 or extends out of the module housing 100 through the first avoidance hole 3211. In this case, the opening of the first avoidance hole 3211 can be prevented from being too large in the same shooting field of view, or on the premise that the opening size of the first avoidance hole 3211 is certain, the above solution undoubted enables the shooting field of view of the lens 311 to be larger. Certainly, the lens 311 of the camera 310 requires the first avoidance hole 3211 to form a gap around the lens 311; and in the rotating process of the camera 310, the presence of the gap can allow the camera 310 to rotate.

In order to facilitate manufacturing and assembling, in an optional solution, the first bracket 320 may be an integrated structural member. For example, the first bracket 320 may be an integrated metal structural member.

In the anti-shake working process, the camera 310 needs to rotate around the first hinged shaft 330 and/or the second hinged shaft. There are many ways to drive the camera 310 to rotate. In an optional solution, the electronic device disclosed by the embodiments of the present invention may further include a driving mechanism, and the driving mechanism may include a permanent magnet and an electromagnet. For example, the electronic device may be equipped with a driving mechanism matched with each moving direction. There may be many types of driving assemblies, for example, direct driving through a driving motor, or driving through a driving motor cooperating with a transmission mechanism. In an optional solution, each driving assembly may include a permanent magnet and an electromagnet, and movement can be driven through a magnetic field force between the electrified electromagnet and the permanent magnet.

In order to improve the appearance performance, in an optional solution, the module housing 100 may be provided with a first cover body 700, and the first cover body 700 is detachably mounted on the module housing 100. In the assembling process, the first cover body 700 is disassembled, the camera 310 and other components are assembled in the housing inner cavity 110, then the first cover body 700 is mounted, the first cover body 700 is provided with a second avoidance hole 710, and the opening of the housing inner cavity 110 is located in the second avoidance hole 710. The module housing 100 with the above structure has high assemblability, which facilitates the mounting of the camera 310.

In the embodiments of the present invention, there may be many mechanisms for driving the module housing 100 to rotate. Referring to FIG. 3 again, in an implementation manner, the driving mechanism 200 may include a driving motor 210, a driving gear 220 and a circular arc rack 231, wherein the circular arc rack 231 is fixedly connected to the module housing 100, the driving gear 220 meshes with the circular arc rack 231, and a power output shaft of the driving motor 210 is in transmission connection with the driving gear 220. Using a gear mechanism to perform power transmission has the advantages of stable transmission, high transmission precision and the like. The circular arc rack 231 can ensure that the module housing 100 rotates in a certain angle, and such structure is suitable for driving rotation of the module housing 100 in a certain angle. Certainly, the circular arc rack 231 may be replaced with an annular rack.

Referring to FIG. 3 again, in an optional solution, the driving mechanism 200 may include an annular structural member 230, the annular structural member 230 may be disposed around the module housing 100, the annular structural member 230 is fixedly connected to the module housing 100, and the annular structural member 230 includes the circular arc rack 231. The annular structural member 230 can play a role in enhancing the strength of the module housing 100, and can facilitate the arrangement of the circular arc rack 231. In order to facilitate mounting, in an optional solution, the annular structural member 230 and the module housing 100 may be an integrated structure.

Based on the camera module disclosed by the embodiments of the present invention, the embodiments of the present disclosure disclose an electronic device. The disclosed electronic device includes the above camera module. The driving mechanism 200 is disposed on the device housing 400, and the module housing 100 is rotatably disposed on the device housing 400.

The module housing 100 is a rotatable structural member and the camera 310 needs power supply in the working process. Based on this, the camera 310 may be powered in a sliding contact power supply manner. However, this power supply structure is complicated and has low stability. Based on this, in an optional solution, the electronic device disclosed by the embodiments of the present invention may further include a flexible electrical connector 500. The electronic device may further include a mainboard disposed in the device housing 400. One end of the flexible electrical connector 500 is electrically connected to the mainboard, and another end of the flexible electrical connector 500 passes through the device housing 400 and is electrically connected to the camera 310. The flexible electrical connector 500 has high deformation ability, so the flexible electrical connector 500 can better adapt to the rotation of the module housing 100 and the camera 310. For example, the flexible electrical connector 500 may be a flexible printed circuit board or a flexible cable.

In an optional solution, the flexible electrical connector 500 may be an elastic electric connection piece. In this case, the flexible electrical connector 500 has high deformation ability, and the flexible electrical connector 500 can adapt to the rotation of the module housing 100 and the camera 310 through its own deformation.

The electronic device disclosed by the embodiments of the present invention may be a smart phone, a tablet computer, an ebook reader, a wearable device and the like. The embodiments of the present invention do not limit the type of the electronic device.

The embodiments of the present disclosure focus on describing differences between the embodiments, and different optimization features of the embodiments may be combined to form better embodiments provided that they are not contradictory. Considering brevity, details are not described herein again.

The above is only embodiments of the present invention, and is not intended to limit the present invention. Various changes and modifications may be made to the present invention by those skilled in the art. Any modifications, equivalent substitutions, improvements and the like made within the spirit and principle of the present invention should be included within the scope of the claims of the present invention.

What is claimed is:

1. A camera module, comprising a module housing, a driving mechanism and a mechanical anti-shake camera assembly, wherein the module housing has a housing inner cavity; the mechanical anti-shake camera assembly is at least partially disposed in the housing inner cavity; the mechanical anti-shake camera assembly rotates along with the module housing; the driving mechanism is connected to the module housing; the mechanical anti-shake camera assembly comprises a camera; in a case that the camera is located at a first position, a lens axis of the camera is coinciding or parallel to a rotation axis of the module housing; and in a case that the camera is located at a second position, an included angle is formed between the lens axis and the rotation axis, and the driving mechanism drives the module housing to rotate;

wherein the driving mechanism comprises a driving motor, a driving gear and an annular structural member; the annular structural member is disposed around the module housing, the annular structural member includes a circular arc rack, and the circular arc rack is fixedly connected to the module housing; the driving gear meshes with the circular arc rack; and a power output shaft of the driving motor is in transmission connection with the driving gear.

2. The camera module according to claim 1, wherein the mechanical anti-shake camera assembly further comprises a first bracket, the first bracket is at least partially disposed in the housing inner cavity, the camera is hinged with the first bracket through a first hinged shaft, the camera rotates around the first hinged shaft, the first bracket is hinged with the module housing through a second hinged shaft, the first bracket rotates around the second hinged shaft, and an axis of the first hinged shaft and an axis of the second hinged shaft are intersected or located on different planes.

3. The camera module according to claim 2, wherein the first bracket is an integrated structural member.

4. The camera module according to claim 2, wherein the axis of the first hinged shaft is perpendicular to the axis of the second hinged shaft.

5. A camera module, comprising a module housing, a driving mechanism and a mechanical anti-shake camera assembly, wherein the module housing has a housing inner cavity; the mechanical anti-shake camera assembly is at least partially disposed in the housing inner cavity; the mechanical anti-shake camera assembly rotates along with the module housing; the driving mechanism is connected to the module housing; the mechanical anti-shake camera assembly comprises a camera; in a case that the camera is located at a first position, a lens axis of the camera is coinciding or parallel to a rotation axis of the module housing; and in a case that the camera is located at a second position, an included angle is formed between the lens axis and the rotation axis, and the driving mechanism drives the module housing to rotate;

wherein the mechanical anti-shake camera assembly further comprises a first bracket, the first bracket is at least partially disposed in the housing inner cavity, the camera is hinged with the first bracket through a first hinged shaft, the camera rotates around the first hinged shaft, the first bracket is hinged with the module housing through a second hinged shaft, the first bracket rotates around the second hinged shaft, and an axis of the first hinged shaft and an axis of the second hinged shaft are intersected or located on different planes;

wherein the first bracket comprises a bracket main body, a first connecting arm and a second connecting arm; one end of the first connecting arm is fixedly connected to the bracket main body, and another end of the first connecting arm extends into the housing inner cavity and is hinged with the module housing through the second hinged shaft; and one end of the second connecting arm is fixedly connected to the bracket main body, and another end of the second connecting arm extends into the housing inner cavity and is hinged with the camera through the first hinged shaft.

6. The camera module according to claim 5, wherein there are two first connecting arms and two second connecting arms, the two first connecting arms are diagonally and respectively distributed on two sides of the camera, and the two second connecting arms are diagonally and respectively distributed on two sides of the camera.

7. The camera module according to claim 5, wherein the bracket main body is provided with a first avoidance hole, and a lens of the camera and the first avoidance hole are disposed opposite to each other.

8. The camera module according to claim 5, further comprising a second bracket, wherein the camera is fixedly connected to the second bracket, and the second bracket is hinged with the first bracket through the first hinged shaft.

9. An electronic device, comprising a device housing and a camera module, wherein the camera module comprises a module housing, a driving mechanism and a mechanical anti-shake camera assembly, the module housing has a housing inner cavity; the mechanical anti-shake camera assembly is at least partially disposed in the housing inner cavity; the mechanical anti-shake camera assembly rotates along with the module housing; the driving mechanism is connected to the module housing; the mechanical anti-shake camera assembly comprises a camera; in a case that the camera is located at a first position, a lens axis of the camera is coinciding or parallel to a rotation axis of the module housing; in a case that the camera is located at a second position, an included angle is formed between the lens axis and the rotation axis, and the driving mechanism drives the module housing to rotate; and the driving mechanism is disposed on the device housing, and the module housing is rotatably disposed on the device housing;

wherein the driving mechanism comprises a driving motor, a driving gear and an annular structural member; the annular structural member is disposed around the module housing, the annular structural member includes a circular arc rack, and the circular arc rack is fixedly connected to the module housing; the driving gear meshes with the circular arc rack; and a power output shaft of the driving motor is in transmission connection with the driving gear.

10. The electronic device according to claim 9, wherein the mechanical anti-shake camera assembly further comprises a first bracket, the first bracket is at least partially disposed in the housing inner cavity, the camera is hinged with the first bracket through a first hinged shaft, the camera rotates around the first hinged shaft, the first bracket is hinged with the module housing through a second hinged shaft, the first bracket rotates around the second hinged shaft, and an axis of the first hinged shaft and an axis of the second hinged shaft are intersected or located on different planes.

11. The electronic device according to claim 10, wherein the first bracket comprises a bracket main body, a first connecting arm and a second connecting arm; one end of the first connecting arm is fixedly connected to the bracket main body, and another end of the first connecting arm extends into the housing inner cavity and is hinged with the module housing through the second hinged shaft; and one end of the second connecting arm is fixedly connected to the bracket main body, and another end of the second connecting arm extends into the housing inner cavity and is hinged with the camera through the first hinged shaft.

12. The electronic device according to claim 11, wherein there are two first connecting arms and two second connecting arms, the two first connecting arms are diagonally and respectively distributed on two sides of the camera, and the two second connecting arms are diagonally and respectively distributed on two sides of the camera.

13. The electronic device according to claim 11, wherein the bracket main body is provided with a first avoidance hole, and a lens of the camera and the first avoidance hole are disposed opposite to each other.

14. The electronic device according to claim 11, further comprising a second bracket, wherein the camera is fixedly connected to the second bracket, and the second bracket is hinged with the first bracket through the first hinged shaft.

15. The electronic device according to claim 10, wherein the first bracket is an integrated structural member.

16. The electronic device according to claim 10, wherein the axis of the first hinged shaft is perpendicular to the axis of the second hinged shaft.

17. The electronic device according to claim 9, further comprising a flexible electrical connector and a mainboard disposed in the device housing, wherein one end of the flexible electrical connector is electrically connected to the mainboard, and another end of the flexible electrical connector passes through the device housing and is electrically connected to the camera.

18. The electronic device according to claim 17, wherein the flexible electrical connector is an elastic electrical connector.

* * * * *